United States Patent

[11] 3,542,451

| [72] | Inventor | Wirt E. Washburn |
| | | Irondequoit, New York |
| [21] | Appl. No. | 834,211 |
| [22] | Filed | June 6, 1969 |
| | | Continuation of application Ser. No. 548,580, May 9, 1966, abandoned. |
| [45] | Patented | Nov. 24, 1970 |
| [73] | Assignee | Bausch & Lomb Incorporated |
| | | Rochester, New York |
| | | a corporation of New York |

[54] WEAR-RESISTANT ENCAPSULATED FIBER OPTICAL ASSEMBLY
1 Claim, 3 Drawing Figs.

[52] U.S. Cl. .................................................. 350/96,
                                                    250/227, 264/1
[51] Int. Cl. ............................................ G02b 5/16
[50] Field of Search............................................ 350/96;
                                                    250/227; 264/1

[56] References Cited
UNITED STATES PATENTS

| 2,163,177 | 6/1939 | Novotny....................... | 264/272 |
| 2,293,633 | 8/1942 | Shaw............................ | 264/277 |
| 3,043,910 | 7/1962 | Hicks........................... | 350/96X |
| 3,104,191 | 9/1963 | Hicks et al.................... | 350/96X |
| 3,158,432 | 11/1964 | Arend et al.................. | 350/96X |
| 3,177,470 | 4/1965 | Galopin....................... | 350/96UX |
| 3,299,167 | 1/1967 | Knowlson et al. ........... | 260/829 |
| 3,301,648 | 1/1967 | Sheldon....................... | 350/96UX |
| 3,357,423 | 12/1967 | Winchester et al. .......... | 350/96X |

OTHER REFERENCES

Stahl et al. " Optical Hole Sensing Using Fiber Optics" Pamphlet TR 21.189, Published Jan. 15, 1966 by IBM Systems Development Division, 2 title pages and pages 1-11 cited.

*Primary Examiner*—David H. Rubin
*Attorney*—Frank C. Parker and Bernard L. Sweeney

ABSTRACT: A fiber optical assembly is disclosed for use in automatic data-processing equipment in which the perforated data cards are optically scanned. One end of the assembly is formed by encapsulating the fiber elements in a ceramic filled thermosetting resin material. This encapsulation is performed in a single application. The assembly is thus better able to withstand the constant abrasion of the punch cards over the face of the assembly.

WIRT E. WASHBURN
INVENTOR.

WIRT E. WASHBURN
INVENTOR.

BY Lowell J. Wise
ATTORNEY

WEAR-RESISTANT ENCAPSULATED FIBER OPTICAL ASSEMBLY

CROSS-REFERENCES TO RELATED APPLICATIONS

This application is a continuation of my copending U.S. Pat. application, Ser. No. 548,580, filed May 9, 1966, now abandoned.

BACKGROUND OF THE INVENTION

This invention relates to a fiber optical assembly formed by encapsulating the optical fiber elements in a ceramic-filled thermosetting phenolic resin material. In particular, it relates to an assembly formed by a method for splaying individual fiber groups from a bundle of fibers and securing these fiber elements in channels or grooves between mold pieces defining a mold cavity. Thereafter, the fibers are encapsulated in a hard phenolic resin containing abrasion-resistant filler by injecting a hot partially cured phenol-aldehyde resin material into the mold cavity under pressure. This thermosetting resin is then hardened by heat and the molds removed. The protruding optical elements are optically finished to provide a flat face with the fiber elements embedded in a hard resin material.

The articles produced by this method are useful for scanning data punch cards containing perforations. Light directed on a face of the optical fiber bundle remotely located from the scanning area can be transmitted in discrete beams onto the scanned locations of the data punch cards to detect perforations.

In the optical scanning of perforated data cards used in various automatic data-processing equipment, it has been found desirable to provide a scanning device having a series of optical fiber elements separated or splayed from one another at one end, but bound together in bundle form having an open face at another end for receiving light from a single source. The splayed and encapsulated fiber elements separate the light source into multiple paths and direct the separate "pinpoint" lights onto predetermined areas of a scanned surface. Frequently, in scanning data punch cards, the face of the scanning device containing the separated fiber elements directly contacts the scanned surface, causing wear of the scanning surface. These rigorous conditions for use of the optical scanning device demand an abrasion-resistant surface. It has been found that a phenolic resin material containing a large amount of abrasion-resistant filler such as glass can successfully withstand the conditions of wear when used as an encapsulating material for optical fiber elements. However, a serious problem arises from the difficulty of molding the phenolic resin containing an extremely high percentage of abrasion-resistant filler. The particular molding composition desired contains about 40 to 75 wt percent phenol-aldehyde polymer formers in a weight ratio of about 1.0 to 1.5 and 25 to 60 wt percent glass particle filler. This molding compound is a partially polymerized B-stage resin which is only flowable under certain conditions.

SUMMARY OF THE INVENTION

It has been discovered that an optical scanning device may be manufactured by a relatively simple molding process in which fiber elements from a fiber bundle may be splayed at one end and encapsulated in predetermined scanning positions by placing the splayed elements in a first mold piece having positioning grooves therein and forming a mold cavity with a second mold piece. Thereafter, a partially polymerized hot phenolic resin containing a high percentage of ceramic filler can be injected into the mold cavity under heat and pressure to fill the mold and surround the splayed fiber elements. After final curing of the phenolic resin by heat, the fiber elements are set in a hard material in scanning position with the fiber axes normal to a scanning surface adapted to contact a perforated scanned surface of a data card. Portions of the fiber elements protrude through the resin surface and are finished to an optical surface quality by machining and grinding the fiber elements and resin to a flat surface.

Accordingly, it is an object of this invention to provide a fiber optical assembly having a plurality of optical fiber elements contained in a flexible bundle, the elements being splayed at one end of the bundle and encapsulated in a phenolic resin containing a high concentration of an abrasion-resistant filler. It is a further object to provide a method for one-step molding of a unitary resin material to encapsulate splayed fiber elements in scanning positions by securing the elements between mold pieces and injecting B-stage resin under pressure. These and other objects and features of the invention will be seen in the following description and in the drawing.

DETAILED DESCRIPTION OF THE PREFERRED EMBODIMENT

Optical fibers are small cylindrically shaped filaments or fine elongated rods which have the property of guiding light rays along nonlinear paths. These are usually thin fibers of glass or other transparent optical material having a diameter of about ten to one hundred microns or more. These fibers transport light from one point to another by multiple internal reflections without much loss of energy.

Static and dynamic scanning devices employ a large number of the thin fibers in a bundle configuration, and a flexible fiber scanner is used for transporting images or light along flexible axes. The bundles frequently comprise several thousand thin optical fibers, which in an embodiment of this invention are separated into a number of smaller bundles to separate the light entering the bundle from a single source into several individual lights at the encapsulated end of the scanner. The separated or splayed bundle fibers may be held separately in subbundles in the large bundle and the subbundles splayed for encapsulation, or the individual fibers may be cemented into fiber elements including a fraction of the total bundle fibers. This latter approach is preferred because of the ease of manufacture. The large bundle usually is formed by surrounding the fibers with a sheath of flexible metal and an outer layer of flexible plastic or rubber. At either end, where the fibers are exposed and the metal and outer layer removed, a metal ferrule is crimped onto the bundle to support the fibers and to provide strong mechanical connections for mounting or encapsulating.

Figure 1:
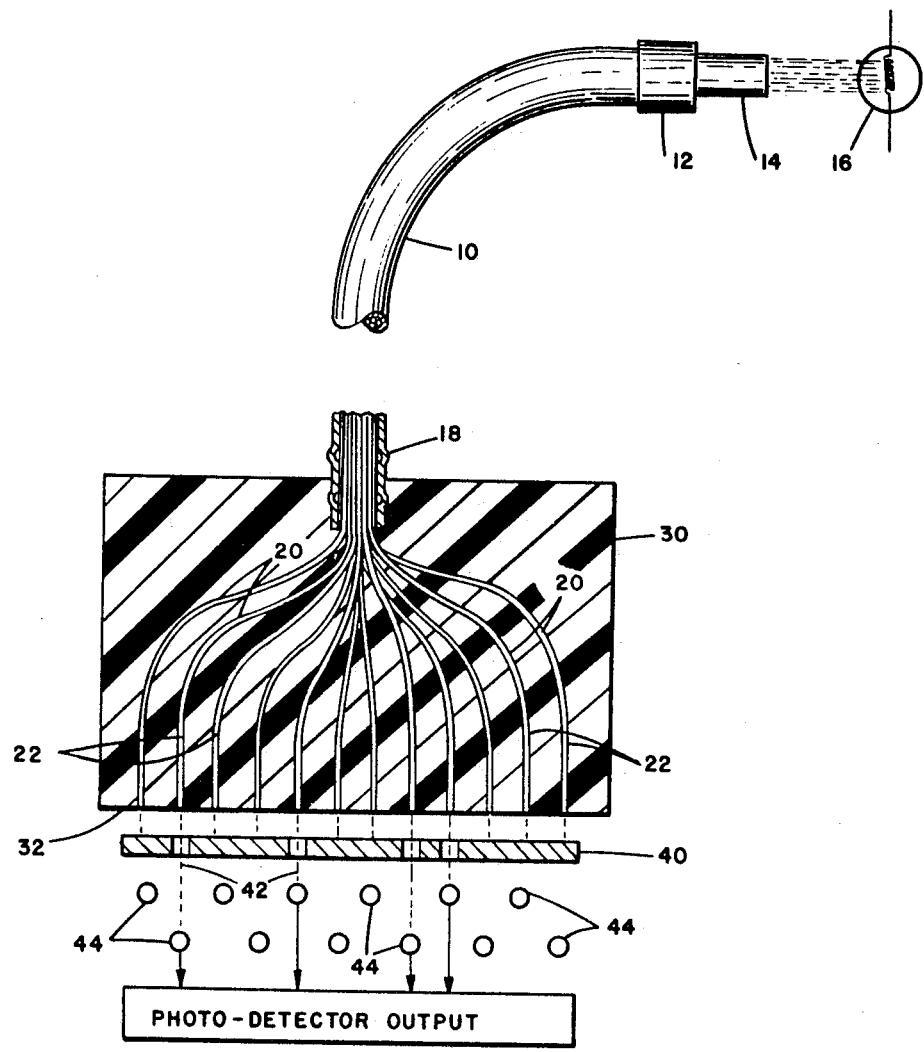
FIG. 1 is a partial cross-sectional view of an encapsulated splayed fiber bundle suitable for use as a scanning device for optical readout of a perforated data punch card.

Referring to FIG. 1, there is shown a tubular clad fiber bundle 10 having a metal ferrule 12 for mounting the bundle in a light receiving position. The fibers at the end of the bundle are ground and polished to provide a face portion 14 which is adapted to receive light from a suitable source such as an incandescent lamp 16. At the opposite end of the bundle 10 a metal ferrule 18 is crimped onto the outer layer of the sheathing. As shown in the drawing, the fibers are separated into twelve smaller fiber elements 20 to provide individual light sources for each of twelve scanned positions on a data card. These elements are alined into the desired configuration. For the particular scanner desired a straight line of evenly spaced fiber elements is arranged. In order to hold the fibers of each element 20 together in a smaller subbundle, cement is applied to the loose splayed fibers or they are held together by a sheathing material. As the fiber elements 20 approach the scanning face, they assume a direction normal to the scanned surface at the terminal portions 22. An encapsulating polymer material 30 is hardened around the fiber elements 20 and a smooth scanning face 32 is finished by machining and polishing to provide a flush surface.

A data punch card 40 having perforations 42 in selected locations adjacent to the light paths defined by the optical fiber elements 20 is designed to block the light rays from some fiber elements while passing others. Photosensitive detectors 44 receive light from lamp 16 through the fibers exposed at the bundle face 14 and transmitted along the flexible axes to the scanning face 32. The light passes through the perforations 42 to actuate the photodetection output system. Data card 40 is usually a standard size paper material employed in the data processing industry. While it might not appear obvious that this material would present a wear problem, it must be considered that the volume of data information scanned by this system is astronomical in number. In the close proximity of the scanning device to the data card during use, contact between the card 40 and the scanning face 32 is frequent. Relative movement is provided between the scanner and card in order to detect perforations in a series of alined rows in the card. The flexibility of the bundle 10 permits light from a relatively fixed position 16 to be transmitted with ease to a plurality of different positions with accuracy. The encapsulating material provides a rigid mounting which holds the fiber elements 20 in a fixed position with respect to direction and relative dimensions.

Because of the wearing of the scanner face 32 by numerous contacts with the data cards, it is necessary to provide the face with abrasion-resistant properties. For this reason a resin filler of ceramic such as glass particles is used with a resin molding composition to form the encapsulating material. A very high amount of abrasion-resistant material (25 to 60 percent) is necessary to provide the needed wear characteristics for the scanner face; however, this tends to make the resin difficult to mold. Phenolic polymer formers and additives make up the balance (40 to 75 percent) of the molding material. In order to assure the proper consistency and homogenity of the encapsulating material it is preferable to partially polymerize the phenolic resin monomers prior to the final encapsulation step and curing. Thermosetting phenol-aldehyde resins are excellent components for binding the ceramic particles and providing the necessary structural properties to the scanning device. However, the B-stage or partially polymerized resin is very difficult to mold, and it has been necessary in the past to form the face portions of scanner elements in a separate operation with subsequent assembly of the fiber elements in the face using a different encapsulating material to hold the splayed elements in place. This is an expensive and time consuming operation which is eliminated by the present invention.

Figure 2:
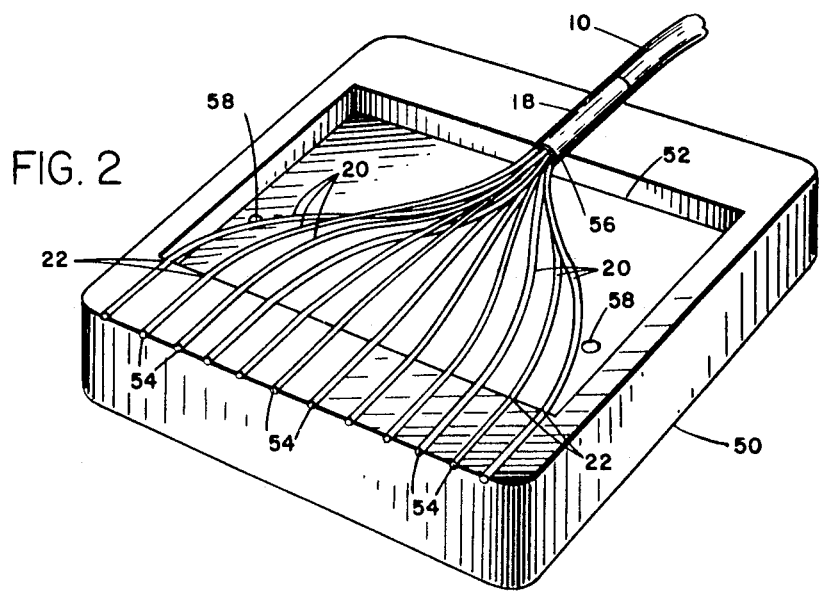
FIG. 2 is a perspective view of a mold piece having grooves for receiving fiber elements.

To encapsulate the scanner apparatus shown in FIG. 1, a molding process is utilized employing a mold piece 50 which is shown in perspective view in FIG. 2. The rectangular mold piece 50 is manufactured from a suitable heat-conducting material such as aluminum or other metal. A cavity 52 is provided in the desired scanner shape and grooves or channels 54 are provided to hold the fiber elements 20 which protrude from cavity 52 during encapsulation. Preferably the fibers are splayed from the bundle 10 and separated into several groups of loose fibers which are cemented together by epoxy resin or other suitable cement material prior to being placed in the mold piece 50. This preshaped structure may be formed using a nonadhesive cementing block of Teflon or polyolefin having means for orienting the loose fibers during splaying and cementing. The block may have a shape similar to that of metal mold piece 50. Alternately, the loose individual fibers may be cemented together in the mold piece to form the fiber elements 20. The mold piece 50 has a groove 56 for receiving the bundle 10 and ferrule 18 and escape holes 58 facilitate molding. After encapsulation in the mold 50 the ends of fiber elements 20 protrude from the resin material, and the scanner face 32 is produced by machining the fiber elements and resin 30 to a flat face having suitable optical quality.

Figure 3:
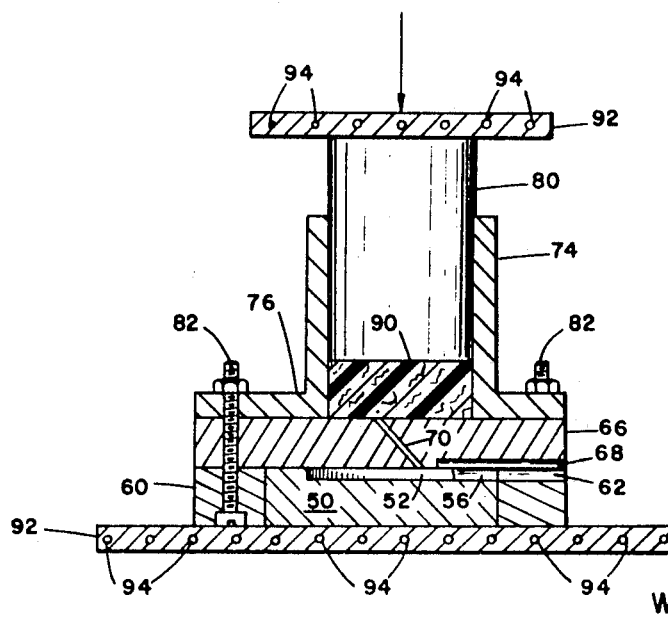
FIG. 3 is a vertical cross-sectional view of an assembled mold showing the relationship between the transfer pot and the mold cavity. Like numerals refer to like parts throughout the drawing.

The molding step for encapsulating the fiber elements is performed in a mold assembly shown in FIG. 3. For simplicity, the fiber bundle and elements are not shown in position. The first mold piece 50 is inserted into a retainer means 60 having an alined groove 62 for holding the fiber bundle in place during molding. A second mold piece 66 is assembled with the first mold piece 50 and retainer 60 to form a mold cavity and to secure the splayed fiber elements in their protruding positions in the grooves or channels 54 in the first mold piece. The upper mold piece 66 also contains a recessed portion 68 alined with the recess 56 for holding the fiber bundle. One or more orifices 70 may be provided for injecting hot resin material under pressure into the mold cavity 52. These passages communicate with a transfer pot comprising a cylindrical sleeve member 74, a base member 76, and a cylindrical plunger means 80. The retainer means 60, mold piece 66 and transfer pot base 76 are held tightly by any suitable fastening means 82 such as bolts and nuts. A quantity of molding resin 90 is placed in the transfer pot and the mold assembly is held between press platens 92 containing resistance heaters 94 for maintaining the molding temperature. The platens 92 force the plunger 80 into the sleeve 74 thereby injecting hot resin 90 into the mold cavity 52 through the orifice 70. After curing of the thermosetting resin by heat, the mold assembly is dismantled and cleaned for reuse.

*EXAMPLE*

An optical fiber scanning device as shown in FIG. 1 is made by splaying the fibers and cementing the elements to form preshaped light paths. A quantity of B-stage Resol molding powder consisting essentially of about 20 wt percent phenol, 30 wt percent formaldehyde, and 50 wt percent glass particles sufficient to fill the mold cavity is weighed and preheated. This material is very difficult to mold and cannot be handled by hydraulic methods at ambient temperatures or low pressures. By heating the resin to about 325°F. the material can be made relatively fluid by higher pressures created in the transfer pot by the press. The resin material is placed in the transfer pot which is maintained at 325°F. by the resistance heaters in the press platens. By applying 800 to 1000 p.s.i. pressure to the resin, it is forced into the mold cavity and around the fiber elements. It should be noted that the B-stage partially polymerized resin is cured to a hard plastic after only 2—3 minutes at the molding temperature, and once set it cannot be remolded. Therefore, the molding step should be performed with dispatch. The heat for molding and curing can be supplied by heating the transfer pot or mold pieces directly, for instance, by embedded resistance or induction heaters. After removing the encapsulated scanner device from the mold assembly, the scanning face is finished by machining.

The molding composition can be varied somewhat from the example given without departing from the inventive concept. Other aldehydes such as acetaldehyde or furfural may be substituted for formaldehyde in about equimolar quantities. Other abrasion-resistant material may be used in the place of the glass filler. Various carbides and metal oxides are known for their resistance to wear. The proportions of resin to filler may also be varied so long as desirable abrasion resistance properties are retained at the scanning face.

While there has been shown and described what is considered to be a preferred embodiment of the present invention, it will be obvious to those skilled in the art that various changes and modifications may be made therein without departing from the invention.

I claim:
1. An integrally-molded, wear-resistant fiber optical assembly for transmitting light from a remote location in a plurality of discrete beams, whose process of fabrication from a conventional bundle of optical fibers having individual diameters of approximately 10 to 100 microns comprises the steps of:
   a. splaying from one end of said bundle of optical fibers a plurality of subbundles of loose fibers;
   b. cementing the loose fibers of each subbundle together by epoxy resin and mounting the main bundle and the ends of said subbundles in grooves formed in different sidewalls in a first mold piece;

c. assembling a second mold piece with the first mold piece to form a mold cavity and to secure the projecting ends of the main bundle and subbundles;

d. injecting B-stage phenol-aldehyde resin material filled with approximately 50 percent glass particles, preheated and maintained at a temperature of approximately 325°F. into said mold cavity under a pressure of between 800 p.s.i. and 1000 p.s.i.;

e. continuing to maintain said heat for about 2 to 3 minutes until said phenol-aldehyde resin material polymerizes to form a solid block;

f. removing said solid block from said molding cavity; and g. machining the projecting ends of said subbundles and the corresponding edge face of said solid block containing said subbundles to a finish of suitable optical quality.